Sept. 27, 1932.                J. J. O'BRIEN                1,879,632
                         ENGINE RELEASE MECHANISM
                          Filed June 4, 1931        2 Sheets-Sheet 1
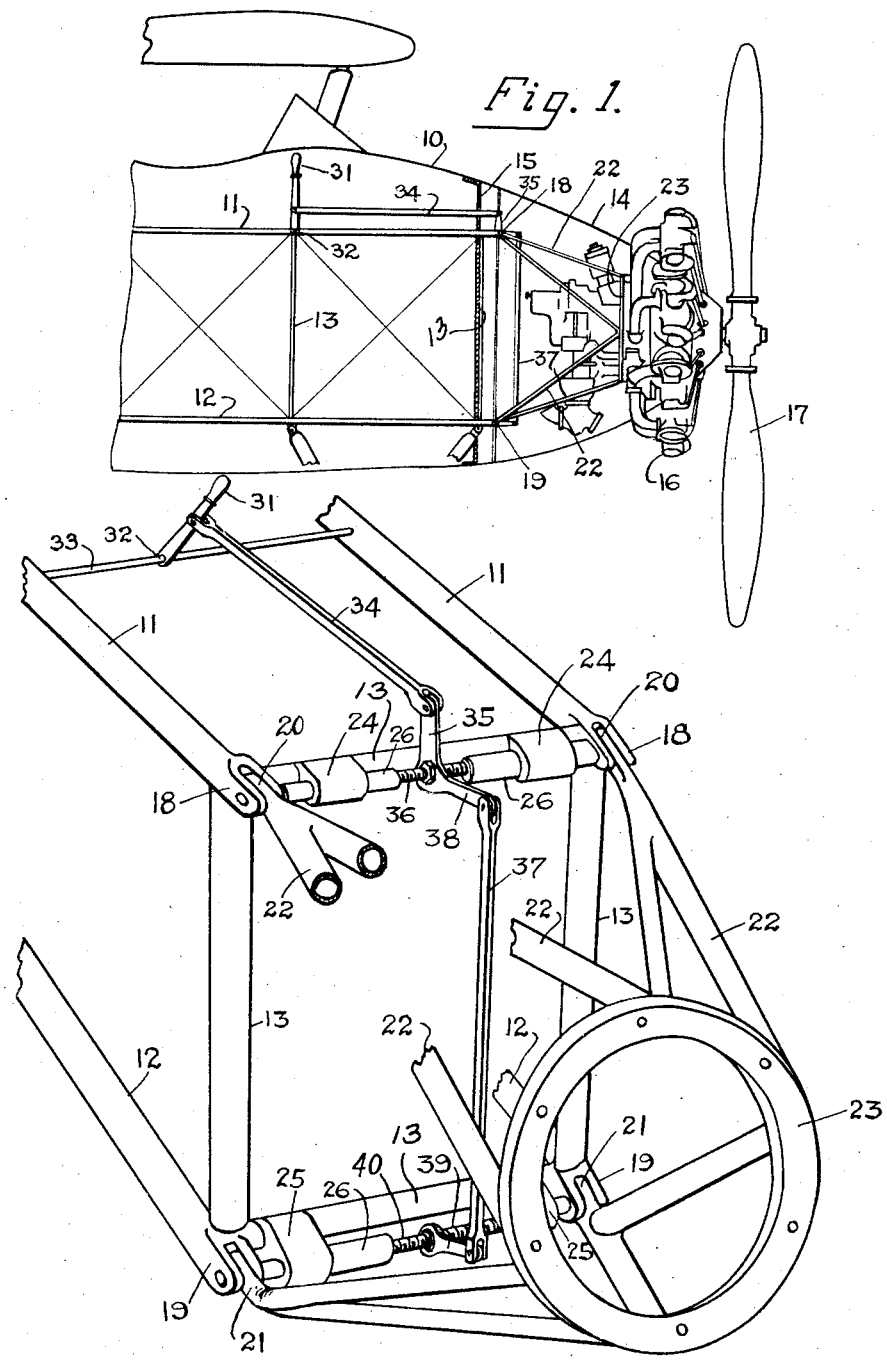
INVENTOR.
JOHN J. O'BRIEN
BY Robert A Lavender
        ATTORNEY.

Sept. 27, 1932. J. J. O'BRIEN 1,879,632
ENGINE RELEASE MECHANISM
Filed June 4, 1931    2 Sheets-Sheet 2
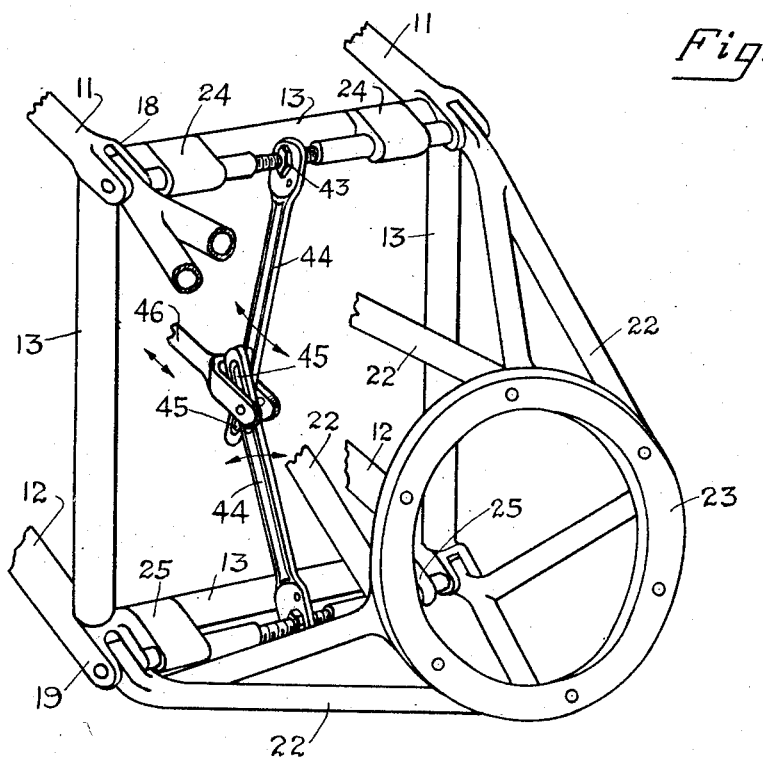
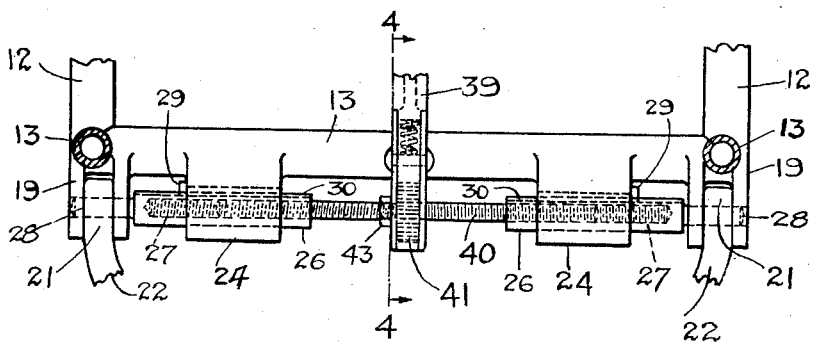
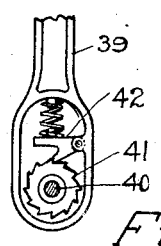
INVENTOR.
JOHN J. O'BRIEN
BY Robert A. Lavender
ATTORNEY.

Patented Sept. 27, 1932

1,879,632

UNITED STATES PATENT OFFICE

JOHN JEREMIAH O'BRIEN, OF LAKEHURST, NEW JERSEY

ENGINE RELEASE MECHANISM

Application filed June 4, 1931. Serial No. 542,123.

(GRANTED UNDER THE ACT OF MARCH 3, 1883, AS AMENDED APRIL 30, 1928; 370 O. G. 757)

My invention relates broadly to an engine release mechanism, and more particularly to a quick detachable engine mount, for aircraft.

The primary object of my invention is to provide a quick release mechanism for aircraft engines, whereby the engine may be released in emergency either while the plane is in the air or after the same has landed on the water.

Another object of my invention being to provide a means of freeing the engine from the airplane when it becomes necessary to make a forced landing, and thus enable the pilot to maneuver the airplane as a glider.

A further object of my invention being to provide a means of saving the personnel of a disabled airplane by releasing the weight of the engine and thus increase the buoyancy of the airplane so as to enable the craft to float upon the surface of the water for a longer period of time thereby prolonging the prospects of a rescue of the personnel carried thereby.

With the above and other objects in view, the invention consists in the construction, combination and arrangement of parts as will be described more fully hereinafter.

Reference is to be had to the accompanying drawings forming a part of the specification, in which like reference characters indicate corresponding parts throughout the several views, and in which:

Figure 1 is a side elevation of the forward portion of a conventional type of the airplane shown more or less diagrammatic, having incorporated therein the feature of my invention.

Figure 2 is a fragmentary perspective of a portion of the frame of an aircraft showing my improved engine release mechanism applied thereto.

Figure 3 is an enlarged fragmentary horizontal section showing my release device in detail.

Figure 4 is a section on the line 4—4 of Figure 3, showing one of the ratchet devices with the cover plate removed.

Figure 5 is a fragmentary perspective of my engine release showing a slightly modified form of operating mechanism.

Referring more particularly to the drawings 10 indicates a portion of a conventional type of airplane, having a frame composed of upper longerons 11, lower longerons 12, and transverse frame members 13. A portion 14, forward of the firewall bulkhead 15, supports the engine 16 and its associated parts including the propeller 17, which by means of a quick release mechanism to be described later, will permit the release of these parts in case of emergency so that the airplane can function as a glider.

Lugs 18 and 19 are located at the forward ends of the longerons 11 and 12 which are provided with aligning apertures with like apertures in ears 20 and 21 located on the struts 22 forming the support for the engine mounting 23 to which the engine 16 is attached. Guide lugs 24 and 25 are secured to the upper and lower transverse members 13 located at the forward end of the fuselage. Locking members 26, are provided with internal threads within the bores 27, and are provided with reduced portions forming bolts 28 which engage the apertures in the lugs 18 and 19, and ears 20 and 21. The locking members 26 are permitted to move in and out transversely, of the fuselage, but are restricted from rotary motion by keys 29 slidable in key-ways 30, as shown in Figure 3.

An operating lever 31 located within convenient reach of the operator is pivotally mounted at 32, to cross rod 33, and is connected by a link 34 to the bell-crank 35. (See Figures 1 and 2.)

The bell-crank 35 transmits rotary motion direct to an upper shaft 36, and through a link 37 attached to an arm 38, and a lever 39 to a lower shaft 40, by means of ratchet wheels 41 secured to the respective shafts 36 and 40, and pawls 42 carried by the members 35 and 39. (See Figure 4 for details of ratchet.)

Each of the shafts 36 and 40 are provided with right and left hand threads which engage corresponding threads in the bore 27 of the locking members 26 as shown more clearly in Figure 3.

When it is desired to release the engine and its associated parts in case of emergency or otherwise the operator by moving a lever 31 back and forth a number of times, will transmit rotation to the threaded shafts 36 and 40 which will cause the locking members to travel inwardly and simultaneously retract the portions 26 at all four points of the engine mounting.

Provision for re-setting the release mechanism is contemplated by application of a wrench applied to the hexagonal portion 43 on the shafts 36 and 40.

Although I have not shown the fuel and oil lines, and the ignition wires leading to the engine, it is to be understood that the same may be severed in any conventional manner, with the falling of the engine; that is, a shearing device may be placed at some convenient place close to the fire wall bulkhead 15, and when the engine drops this device will shear the lines.

In the modified form of engine release mechanism as disclosed in Figure 5, I have provided two levers 44 for operating the ratchets 41 which will transmit rotary motion to the shafts 36 and 40 for withdrawing the bolts 28 for the release of the engine. The levers 44 are slotted at their ends as at 45, and are connected to an operating link 46. To release the engine, the link 46 is moved back and forth a number of times until the levers 44 and the ratchet mechanisms 40 and 41 retract the member 28 from the ears 20 and 21.

It will be understood that the above description and accompanying drawings comprehend only the general and preferred embodiment of my invention, and that various changes in construction, proportion and arrangement of parts may be within the scope of the appended claims, and without sacrificing any of the advantages of my invention.

The herein described invention may be manufactured and used by or for the Government of the United States for governmental purposes without the payment to me of any royalty thereon or therefor.

What I claim is:—

1. In an emergency release for aircraft, in combination, a fuselage having longerons terminating in a plurality of apertured lugs, a power plant including an engine and propeller mounted upon a supporting frame having registering apertured lugs, retracting bolts slidable within the apertures of said lugs, guides for said retracting bolts supported by members of said fuselage, associated keys and key-ways between said guides and bolts for restricting rotary motion, shafts having opposed right and left hand threads engaging correspondingly threaded bores of said retracting bolts, ratchet members supported by said shafts for imparting rotary motion thereto, and a manually operated lever connected by linkage to said ratchet members for the ratchets for release of said engine.

2. In an emergency release for aircraft, in combination, a fuselage having longerons terminating in a plurality of apertured lugs, a power plant including an engine and propeller mounted upon a supporting frame having registering apertured lugs, retracting bolts slidable within the apertures, guides for said retracting bolts supported by members of said fuselage, associated keys and key-ways between said guides and bolts for restricting rotary motion, shafts having opposed right and left hand threads engaging correspondingly threaded bores of said retracting bolts, ratchet members terminating in levers, interconnecting links, and a manually operated lever.

3. In an emergency release for aircraft, in combination, a fuselage having longerons terminating in a plurality of apertured lugs, a power plant including an engine and propeller mounted upon a supporting frame having registering apertured lugs, retracting bolts slidable within the apertures of said lugs, guides for said retracting bolts supported by members of said fuselage, associated keys and key-ways between said guides and bolts for restricting rotary motion, shafts having opposed right and left hand threads engaging correspondingly threaded bores of said retracting bolts for operating the same simultaneously, ratchet members supported by said shafts for imparting rotary motion thereto, and a manually operated lever connected by linkage to said ratchet members for retracting said bolts to release said engine.

4. In an emergency release for aircraft, in combination, a fuselage having longerons terminating in a plurality of apertured lugs, a power plant including an engine and propeller mounted upon a supporting frame having registering apertured lugs, retracting bolts slidable within the apertures of said lugs, guides for said retracting bolts supported by members of said fuselage, associated keys and key-ways between said guides and bolts for restricting rotary motion, shafts having opposed right and left hand threads engaging correspondingly threaded bores of said retracting bolts, ratchet members supported by said shafts for imparting rotary motion thereto, and means for operating a plurality of said retracting bolts simultaneously.

JOHN JEREMIAH O'BRIEN.